United States Patent
Yeh et al.

(10) Patent No.: US 7,257,103 B2
(45) Date of Patent: Aug. 14, 2007

(54) WIRELESS COMMUNICATION METHOD WITH CHANNEL SHARED FUNCTION

(75) Inventors: Tain-Der Yeh, Hsinchu (TW); Chun-Ping Lin, HsinChu (TW)

(73) Assignee: Winbond Electronics Corporation, Hsinchu (TW)

( * ) Notice: Subject to any disclaimer, the term of this patent is extended or adjusted under 35 U.S.C. 154(b) by 1029 days.

(21) Appl. No.: 10/360,096

(22) Filed: Feb. 7, 2003

(65) Prior Publication Data
US 2004/0066768 A1 Apr. 8, 2004

(30) Foreign Application Priority Data
Oct. 4, 2002 (TW) ................. 91123044 A

(51) Int. Cl.
*H04B 7/212* (2006.01)
*H04J 3/00* (2006.01)
(52) U.S. Cl. ............ 370/337; 370/347; 370/437; 370/342; 370/330; 370/332; 370/350; 455/452.2; 455/450; 455/502
(58) Field of Classification Search ......... 370/347, 370/342, 337, 330, 332, 437; 455/522
See application file for complete search history.

(56) References Cited

U.S. PATENT DOCUMENTS

| | | | | |
|---|---|---|---|---|
| 5,943,621 A | * | 8/1999 | Ho et al. ................. | 455/456.3 |
| 5,987,032 A | * | 11/1999 | Nadgauda et al. .......... | 370/437 |
| 5,999,818 A | * | 12/1999 | Gilbert et al. .............. | 455/448 |
| 6,011,800 A | * | 1/2000 | Nadgauda et al. .......... | 370/437 |
| 6,047,189 A | * | 4/2000 | Yun et al. ................. | 455/452.2 |
| 6,067,294 A | * | 5/2000 | Kubo et al. ................. | 370/347 |
| 6,085,076 A | * | 7/2000 | Lindsay et al. .......... | 455/277.1 |
| 6,115,612 A | * | 9/2000 | Fukuda ........................ | 455/517 |
| 6,122,270 A | * | 9/2000 | Whinnett et al. ........... | 370/342 |
| 6,175,737 B1 | * | 1/2001 | Kao ........................... | 455/447 |
| 6,243,371 B1 | * | 6/2001 | Chawla et al. .............. | 370/347 |

* cited by examiner

*Primary Examiner*—Marceau Milord
(74) *Attorney, Agent, or Firm*—Squire, Sanders & Dempsey LLP

(57) ABSTRACT

The present invention is relative to a method for wireless communication with channel share function. There are a first T/R (Transmitting/Receiving) unit and a second T/R unit in a wireless communication channel. The method comprises steps of: transmitting a first data in a first time slot by the first T/R unit, and transmitting a second data in a second time slot by the second T/R unit; deciding a synchronous beginning time slot by the time when the first T/R unit receives the second data; and transmitting the first data at a third time slot by the first T/R unit after the synchronous beginning time slot.

16 Claims, 4 Drawing Sheets

WIRELESS COMMUNICATION METHOD WITH CHANNEL SHARED FUNCTION

FIELD OF THE INVENTION

The present invention is relative to a wireless communication method, especially for the method that is based on the TDMA (Time Division Multiple Access) theory to share and use the same channel for several users.

BACKGROUND OF THE INVENTION

During the development of the wireless controlled toys, one of the main problems, which will be faced, is how to avoid the controlling signals or transmission data collision or destroy when we use the same type of wireless controlling toys together with the same wireless channel, or the toys will be out of control.

So far, the wireless channels released for amateur are quit few. In Taiwan for example, the frequency that can be used for the remote controllers of model aircraft devices and model surface craft devices are listed as below:

(2.1) Following bands can be used for any kind of remote controller:
26.995, 27.045, 27.095, 27.120, 27.136, 27.145, 27.195, 27.245 (MHz)

(2.2) Following bands can only be used for the remote controllers of model aircraft devices:
72.00~72.99 MHz, with 20 kHz frequency interval (2.3) Following bands can only be used for the remote controllers of model surface craft devices:
75.41~75.99 MHz, with 20 kHz frequency interval Therefore, there are 50 channels that can be used for model aircraft devices, and there are 30 channels that can be used for model surface craft devices. In addition, there are 8 general remote controlling channels, then there are 58 and 38 channels can be used respectively. Under above limitation, if there is only one remote controlling craft device used in a place, then the channel collision of radio frequency will not be occurred. If there are many remote controlling craft devices, just likes the racing parks of model aircraft and model car craft devices, then the channel collision of radio frequency would be happened. In order to avoid the interruption and collision of radio frequency channels, the traditional and advanced remote controllers provide several channels for manual switching by the users. An expert user would label the channel that he currently uses on the antenna of the remote controlling device to notice the others for avoiding interruption. Further more, the higher end remote controlling devices will switch to different radio channels automatically if the radio frequency channels collision occurred. But under the limitation of useful radio frequency channels, the collision and interruption of radio frequency channel cannot be avoided absolutely.

SUMMARY OF THE INVENTION

An object of the present invention is to avoid interruption and collision problems of radio frequency channels.

Another object of the present invention is based on the TDMA (Time Division Multiple Access) theory to share the same channel for several users.

Another object of the present invention is to guarantee every user has the same bandwidth for data transmission.

Another object of the present invention is to avoid controlling signals' interruption and collision between different remote controllers any more, and the interruption problem of radio frequency channels will be solved.

According to the present invention, a method for wireless communication with channel share function having a first T/R (Transmitting/Receiving) unit and a second T/R unit in a wireless communication channel and comprises steps of:

Transmit a first data in a first time slot by the first T/R unit, and transmit a second data in a second time slot by the second T/R unit.

Decide a synchronous beginning time slot by the time when the first T/R unit receives the second data.

Transmit the first data at a third time slot by the first T/R unit after the synchronous beginning time slot.

In accordance with one aspect of the present invention, the first T/R unit and the second T/R unit are wireless communication devices.

In accordance with one aspect of the present invention, the wireless communication devices are wireless remote controlling toys.

In accordance with one aspect of the present invention, the wireless communication devices are mobile phones.

In accordance with one aspect of the present invention, the first data contains a first identification code for distinguishing the first data is transmitted from the first T/R unit.

In accordance with one aspect of the present invention, the second data contains a second identification code for distinguishing the second data is transmitted from the second T/R unit.

In accordance with one aspect of the present invention, the first identification code and the second identification code are integers.

In accordance with one aspect of the present invention, the first T/R unit and the second T/R unit are at the receiving state when they are not in the time slot of data transmission.

According to the present invention, a wireless communication system of time division multiple access method in one single communication channel comprises a plurality of T/R (Transmitting/Receiving) units. The plurality of T/R units contains a unique identification code respectively. The feature of the wireless communication system is, the plurality of T/R unit transmits data in a time slot during a time axis and the transmission sequence is based on the sequence of the unique identification code.

In accordance with one aspect of the present invention, the T/R units are wireless communication devices.

In accordance with one aspect of the present invention, the wireless communication devices are wireless remote controlling toys.

In accordance with one aspect of the present invention, the wireless communication devices are mobile phones.

In accordance with one aspect of the present invention, the unique identification code is an integer.

In accordance with one aspect of the present invention, the T/R units are at the receiving state when they are not in the time slot of data transmission.

The present invention may best be understood through the following description with reference to the accompanying drawings, in which:

DETAILED DESCRIPTION OF THE PREFERRED EMBODIMENT

Figure 1:
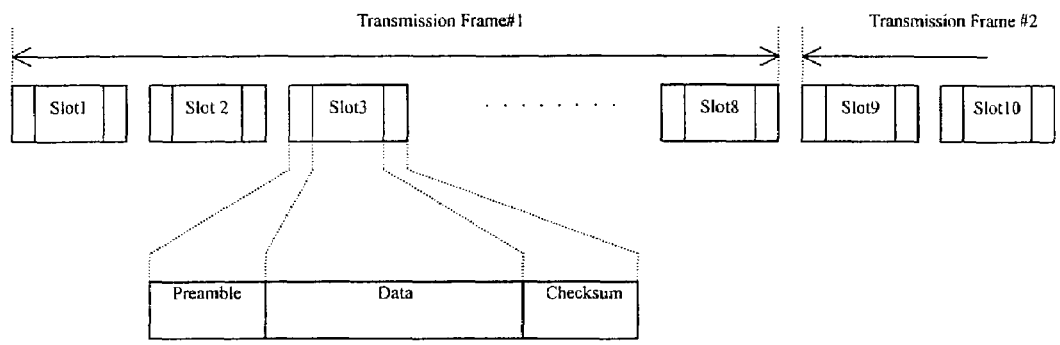
FIG. 1 shows the architecture of a TDMA transmission frame.

The present invention is relative to a method for wireless communication with channel-shared function, which is based on the TDMA (Time Division Multiple Access) theory. FIG. 1 shows the architecture of TDMA transmission frame. There are 8 time slots in every transmission frame, and every time slot presents the transmitting action of a specific T/R (Transmitting/Receiving) unit.

Figure 2:
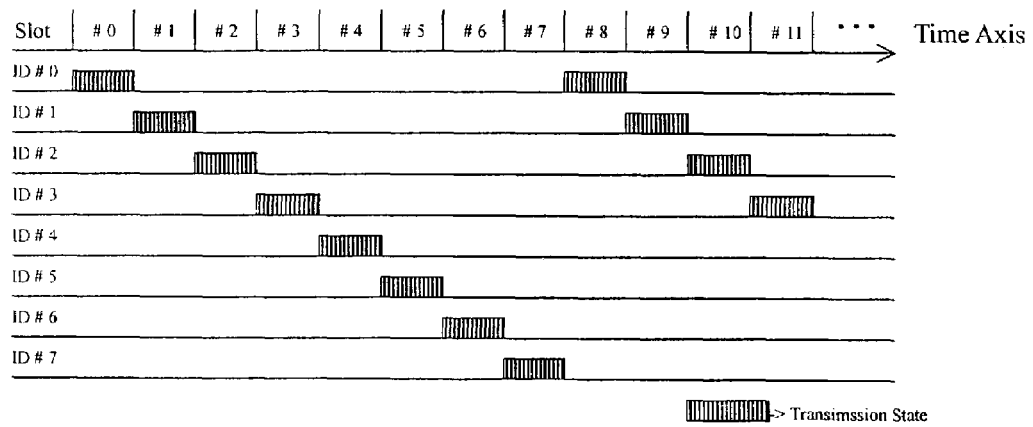
FIG. 2 shows T/R (Transmit/Receive) units transmit or receive data by channel shared communication protocol.

In order to distinguish every different T/R unit, every T/R unit is assigned to a unique identification code (ID) to transmit data in the specific time slot. Please refer FIG. 2. There are 8 T/R units with 8 identification codes from ID#0 to ID#7 respectively. These T/R units can transmit data by channel shared communication protocol. After transmitting in a time slot, the T/R unit will change to receiver mode to "listen" to others.

Figure 3A:
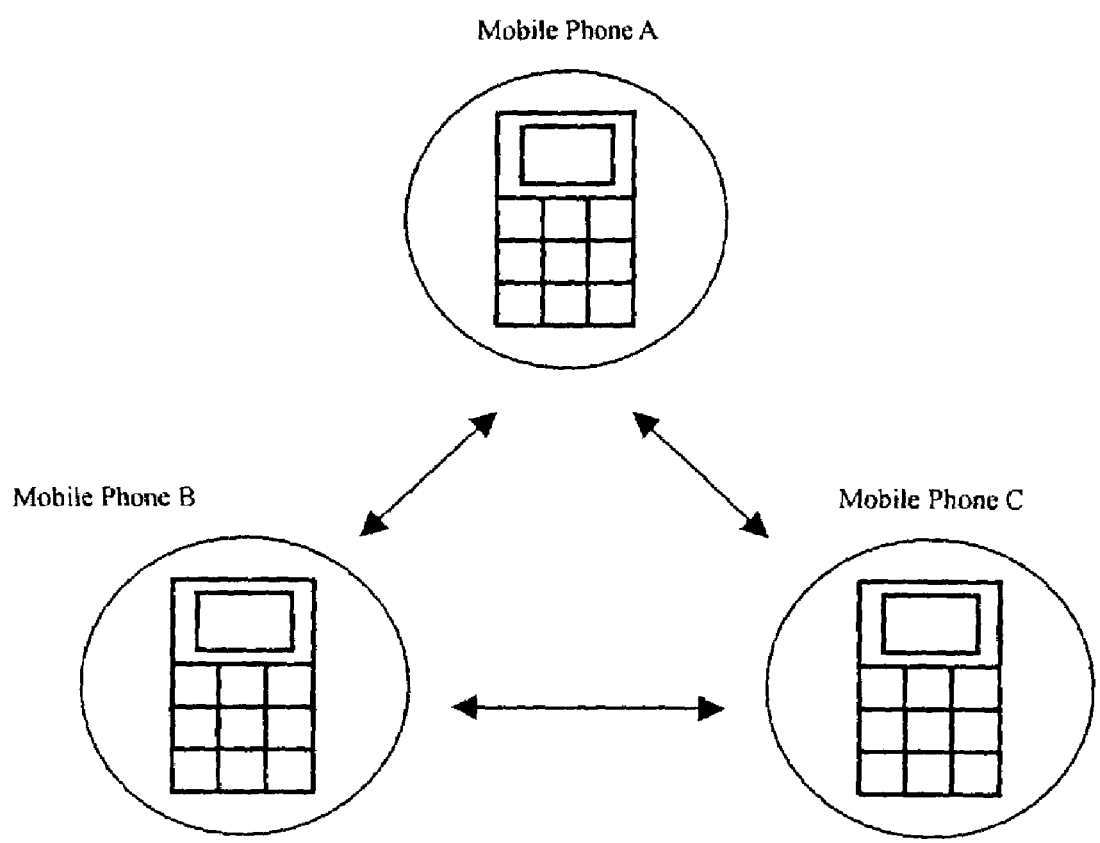
FIGS. 3(A)-3(B) shows a preferred embodiment by channel shared communication method according to the present invention.

In brief, here is a mobile phone communication progress for example. Please refer the FIG. 3(A) and FIG. 3(B), three mobile phones A, B and C are going to communicate in FIG. 3(A), and there should be TDMA waveform like that in FIG. 3(B). Mobile phone A sends its message on time slot1, then mobile phone B and mobile phone C receive the message on time slot1 and synchronize their internal timer with mobile phone A. Mobile phone B then follows mobile phone A to send its data on time slot2. At the same time, mobile phone C also counts at time slot2. When mobile phone B finish sending its data, mobile phone A and mobile phone C will synchronize with mobile phone B and mobile phone C follow it to send data on time slot3. It is obvious that if someone's data transmits to others successfully, the whole system members can be synchronized thereafter. And the time receiving data successfully will be the synchronization beginning time slot, just likes the time slot 1 in FIG. 3(B).

But, how to guarantee is the first data transmission successful? We may identify different transmission cycles for every mobile phone to avoid channel collision, and the transmission cycles are decided by the identification codes (IDs) of the mobile phones. Because all the identification codes are unique in the same system, so the collision would be absolutely avoid by setting a partial parameter "talkclk" in every mobile phone to calculate how many time slots they are before next data transmission. Please refer FIG. 4. The identification codes of mobile phone A, B, and C are ID#0, ID#1, and ID#2 respectively. Assuming that there are only these three IDs in the whole communication system, then after the ID#0 transmitting data in a time slot, the partial parameter talkclk would be set to (0+3=3), just as the predefined data transmitting cycle of the communication system before synchronization, and the mobile phone A will be able to transmit data again at the third time slot after the previous transmission as FIG. 4. However, if any other mobile phone receives data successfully, the time is at the synchronization beginning time slot, and the communication system will move to the synchronous state as FIG. 3(B), and therefore talkclk will be changed by the identification code contained in the received data. The calculation rules is listed as below:

The total number of ID defined in one single channel communication system is N

After ID#X transmitting data, its talkclk will be set to talkclk=X+N

When ID#Y receives the data from ID#X, the talkclk of ID#Y will be set to talkclk=Y−X (if Y>X)

talkclk=(N+Y)−X (if Y<X)

Figure 3B:
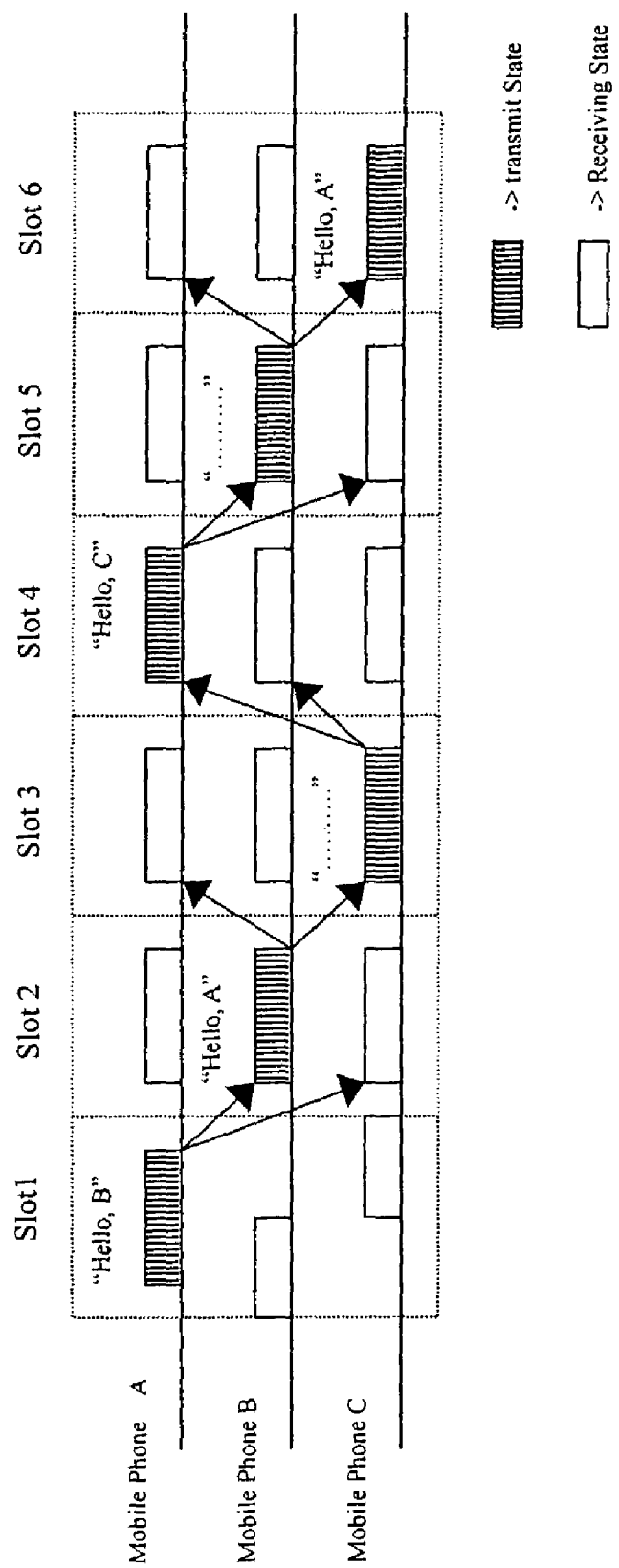
Figure 4:
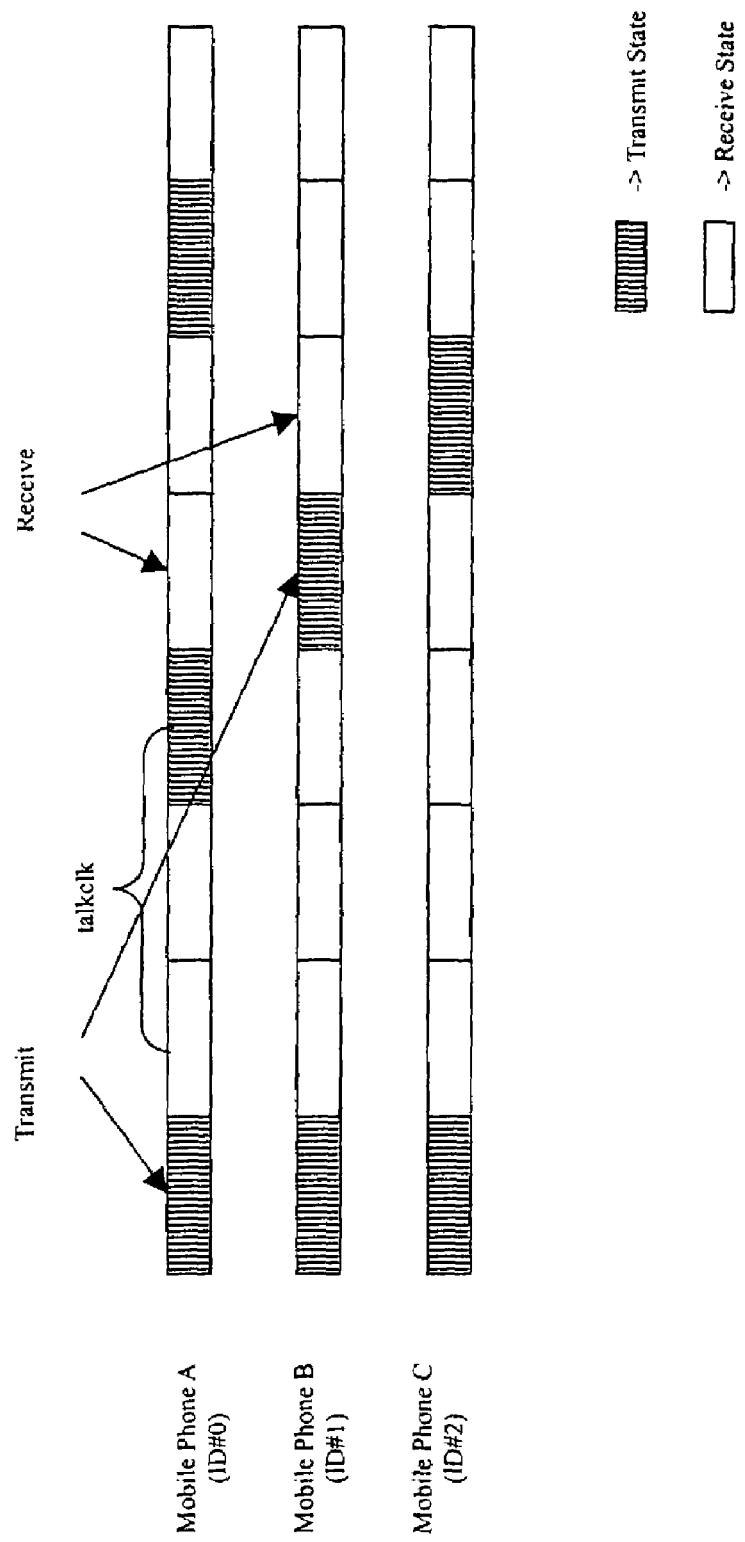
FIG. 4 shows a predefined data transmission cycle before the synchronization of the communication system.

After the communication system moves to the synchronization communication state as FIG. 3(B), all the mobile phones should be able to transmit and receive data by channel shared communication protocol sequentially without channel interruption problem.

The application field of the present invention is very extensive, the channel interruption problem of previous introduced remote controlling toys will also be solved easily. Due to the T/R units in the same communication system would use only one communication channel, we may expand the number of ID properly for market requirements to avoid data collision when all the remote controlling toys are using together.

The present invention provides an improvement for traditional skills, based on the TDMA (Time Division Multiple Access) theory the present invention develops a channel shared communication method to allow several users share the same bandwidth in a channel. The most improvement of the present invention is, every user with this channel shared communication method would share and use the same bandwidth for data transmission, and there is no any interruption and collision of controlling signal absolutely. Furthermore, the wireless channel interruption problem would be solved.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims that are to be accorded with the broadest interpretation so as to encompass all such modifications and similar structures.

What is claimed is:

1. A method for wireless communication with channel shared function, said method providing a first T/R (Transmitting/Receiving) unit and a second T/R unit in a wireless communication channel, and comprising steps of:

assigning an unique identification code (ID) for the first T/R unit and the second T/R unit respectively;

transmitting a first data in a first time slot by said first T/R unit, and transmitting a second data in a second time slot by said second T/R unit;

deciding a synchronous beginning time slot when said first T/R unit receives said second data;

adjusting a partial parameter of the first T/R unit in accordance with the identification code of the second T/R unit after said synchronous beginning time slot is decided, said partial parameter denoting a number of time slots to be taken prior next data transmission; and transmitting said first data at a third time slot by said first T/R unit in accordance with the adjusted partial parameter of the first T/R unit.

2. A method according to claim 1 wherein said first T/R unit and said second T/R unit are wireless communication devices.

3. A method according to claim 2 wherein said wireless communication devices are wireless remote controlling toys.

4. A method according to claim 2 wherein said wireless communication devices are mobile phones.

5. A method according to claim 1 wherein said first data contains a first identification code for distinguishing said first data is transmitted from said first T/R unit.

6. A method according to claim 5 wherein said second data contains a second identification code for distinguishing said second data is transmitted from said second T/R unit.

7. A method according to claim 6 wherein said first identification code and said second identification code are integers.

8. A method according to claim 1 wherein said first T/R unit and said second T/R unit are at a receiving state when they are out the time slot of data transmission.

9. The method according to claim 1, wherein
the assigned identification code (ID) of the second T/R unit is integer X,
the assigned identification code (ID) of the first T/R unit is integer Y,
the partial parameter is talkclk, which is set by adding N after data transmission, wherein N is the total unit quantity of the first T/R unit and the second T/R unit,
the partial parameter talkclk of the first T/R unit is adjusted as follows
talkclk=Y−X if Y is greater than X,
talkclk=(N+Y)−X if X is greater than Y.

10. A wireless communication system of time division multiple access method in one single communication channel, said wireless communication system comprising a plurality of T/R (Transmitting/Receiving) units, said plurality of T/R units comprising a unique identification code respectively, the feature of said wireless communication system is, said plurality of T/R unit transmitting data in a time slot during a time axis, and the transmission sequence is based on the sequence of said unique identification code;
wherein a synchronous beginning time slot is decided when a receiving T/R unit receives data from a transmitting T/R unit;
adjusting a partial parameter of the receiving T/R unit in accordance with the identification code of the transmitting T/R unit after said synchronous beginning time slot is decided, said partial parameter denoting a number of time slots to be taken prior next data transmission.

11. A wireless communication system according to claim 10 wherein said T/R units are wireless communication devices.

12. A wireless communication system according to claim 11 wherein said wireless communication devices are wireless remote controlling toys.

13. A wireless communication system according to claim 11 wherein said wireless communication devices are mobile phones.

14. A wireless communication system according to claim 10 wherein said unique identification code is an integer.

15. A wireless communication system according to claim 10 wherein said T/ R units are at the receiving state when they are out the time slot of data transmission.

16. The wireless communication system according to claim 10, wherein
the assigned identification code (ID) of the transmitting T/R unit is integer X,
the assigned identification code (ID) of the receving T/R unit is integer Y,
the partial parameter is talkclk, which is set by adding N after data transmission, wherein N is the total quantity of the T/R unit,
the partial parameter talkclk of the receving T/R unit is adjusted as follows,
talkclk=Y−X if Y is greater than X
talkclk=(N+Y)−X if X is greater than Y.

* * * * *